US008640744B2

(12) United States Patent
Dowel

(10) Patent No.: US 8,640,744 B2
(45) Date of Patent: Feb. 4, 2014

(54) APPARATUS FOR REPAIRING AND INFLATING OF DAMAGED INFLATABLE ARTICLES

(75) Inventor: Terence Dowel, Ferntree Gully (AU)

(73) Assignee: Trydel Research Pty. Ltd., Victoria (AU)

( * ) Notice: Subject to any disclaimer, the term of this patent is extended or adjusted under 35 U.S.C. 154(b) by 211 days.

(21) Appl. No.: 13/142,805

(22) PCT Filed: Jan. 7, 2010

(86) PCT No.: PCT/AU2010/000015
§ 371 (c)(1),
(2), (4) Date: Aug. 16, 2011

(87) PCT Pub. No.: WO2010/078626
PCT Pub. Date: Jul. 15, 2010

(65) Prior Publication Data
US 2011/0290372 A1    Dec. 1, 2011

(30) Foreign Application Priority Data

Jan. 7, 2009    (AU) ................................ 2009900049

(51) Int. Cl.
*B65B 31/00*    (2006.01)
*B29C 73/02*    (2006.01)
(52) U.S. Cl.
USPC ............... 141/38; 141/67; 141/330; 141/383; 81/15.6; 152/415
(58) Field of Classification Search
USPC ..................... 141/38, 67, 329–330, 382–383; 81/15.6; 152/415
See application file for complete search history.

(56) References Cited

U.S. PATENT DOCUMENTS

| 6,668,875 | B2 * | 12/2003 | Kojima et al. ................. 141/38 |
| 6,786,247 | B1 * | 9/2004 | Kemppainen et al. .......... 141/84 |
| 7,178,564 | B2 * | 2/2007 | Kojima et al. ................. 141/38 |
| 7,694,698 | B2 * | 4/2010 | Marini ........................... 141/38 |
| 7,789,112 | B1 * | 9/2010 | Wise .............................. 141/95 |
| 8,016,002 | B2 * | 9/2011 | Yoshida et al. ................ 141/38 |

(Continued)

FOREIGN PATENT DOCUMENTS

EP    2123432 A1    11/2009
WO    2008/075719 A1    6/2008

OTHER PUBLICATIONS

International Search Report for PCT/AU2010/000015.

*Primary Examiner* — Timothy L Maust
*Assistant Examiner* — Timothy P Kelly
(74) *Attorney, Agent, or Firm* — Vedder Price P.C.

(57) ABSTRACT

An apparatus for repairing and/or inflating a damaged and/or deflated inflatable article, includes a first container (1) for receiving and retaining for dispensing a sealant composition, a second container (100) which has housed thereon a compressor assembly which is releasably connectable to the first container (1), and means (200) allowing for controlled dispensing of the sealant composition from the first container (1) to the inflatable article, the said compressor assembly includes a housing (201) for a compressor which defines, with the interposition of valve means (200) a seating for the first container (1). The valve means (200) includes a main body portion which, in use, is releasably connected to neck portions of both the first and second containers (1,100). The valve means (200) includes passageways (203, 220) to be connected, via hoses (205, 223) to the first container (1) and inflatable article respectively.

24 Claims, 6 Drawing Sheets

(56) References Cited

U.S. PATENT DOCUMENTS

| | | | |
|---|---|---|---|
| 8,020,588 B2* | 9/2011 | Wang | 141/38 |
| 8,201,586 B2* | 6/2012 | Yoshida et al. | 141/38 |
| 8,205,645 B2* | 6/2012 | Dowel | 141/38 |
| 8,276,624 B2* | 10/2012 | Steele et al. | 141/38 |
| 2004/0173282 A1 | 9/2004 | Laetgaard | |
| 2008/0092984 A1 | 4/2008 | Marini | |
| 2008/0145245 A1* | 6/2008 | Chou | 417/415 |
| 2013/0000777 A1* | 1/2013 | Kojima et al. | 141/38 |
| 2013/0092286 A1* | 4/2013 | Chou | 141/38 |
| 2013/0105055 A1* | 5/2013 | Chou | 152/416 |

* cited by examiner

US 8,640,744 B2

APPARATUS FOR REPAIRING AND INFLATING OF DAMAGED INFLATABLE ARTICLES

FIELD OF THE INVENTION

The present invention relates, in general terms, to an apparatus and method for the sealing/resealing and subsequent re-inflating of damaged inflatable articles, as for example a tyre for a vehicle of any given type. More particularly, but not exclusively, the invention relates to an improved apparatus in the form of a kit including a means for the injection into a damaged inflatable article, as for example a punctured vehicle tyre, of a fluid which is capable of re-sealing such damaged inflatable article, whereby to allow for subsequent re-inflation thereof.

BACKGROUND OF THE INVENTION

With any wheeled vehicle there always exists the possibility of damage, as for example in the form of puncture, being sustained by any one or more of pneumatic or inflatable tyres or the like associated therewith. Once a puncture occurs, then the pressure within the tyre decreases, either drastically or progressively and gradually such that, within a finite period of time, the relevant tyre or the like inflatable article is not suited for use. It then becomes necessary for the inflatable article to be either repaired in-situ, to allow for subsequent re-inflation and re-use, or in the alternative removed and replaced to allow for re-use of the wheeled vehicle and off-site repair of the damaged tyre (if not too seriously damaged to make repair impossible or impractical). Whilst the method and apparatus in accordance with the present invention is particularly intended for use in allowing for the repairing and re-inflating, in-situ, of a damaged inflatable article, it should be understood that the method and apparatus in accordance with the invention may equally well be employed for purposes of off-site repair, as for example once the damaged inflatable article has been removed from the relevant vehicle and replaced by an intact, undamaged tyre.

Damage to inflatable articles, as for example a vehicle tyre, is generally caused by penetration of the tyre by a sharp object or objects, for example a nail, broken glass or the like. These days, as a result of significant improvements in the quality of vehicle tyres, punctures are not as common as they once were. Be that as it may, however, punctures still do happen and such can be expected to give rise to the vehicle being non-usable (at least temporarily).

It has become an accepted practice for a vehicle, such as for example a car, truck or the like, to have stored at a location therein or thereon at least one replacement tyre, intended to be used in an emergency situation, as for example when a puncture is sustained. However, in order for such a spare tyre to be usable the vehicle also has to have included therewith a jack or the like lifting means, as well as means (for example a wheel spanner or wheel brace) to loosen wheel nuts to allow for removal of the damaged tyre and replacement thereof. The task of removing a damaged tyre and replacing that tyre can be a time-consuming, onerous and potentially dangerous task. Furthermore, it is a task of the type best not undertaken by a significant percentage of the population, as for example people with physical deficiencies, elderly people, etc.

To overcome this problem the practice has been developed of including, with any given vehicle, a kit which can be employed for purposes of repairing, albeit temporarily, and re-inflating a damaged vehicle tyre. The provision of such a kit can, in one scenario, mean that a replacement or spare tyre does not need to be provided. Furthermore, if it is not necessary to actually remove and replace a damaged tyre, then the tools and other equipment needed to effect such a task, including wheel brace, jack etc, are no longer necessary. The end result is that the vehicle, without a spare tyre, will have greater storage capacity. Furthermore, the absence/omission of a spare tyre leads to considerable weight saving. Prior art repair kits of this general type have, however, suffered by being not particularly user-friendly. The present invention seeks to overcome the problems and disadvantages associated with the prior art by providing an apparatus, in the form of a repair kit, which is compact and hence easily stored when not in use, is re-usable and is, in practical terms, extremely simple and yet effective to operate.

DISCLOSURE OF THE INVENTION

It is an object of the invention to provide an apparatus and method for the sealing/resealing and subsequent re-inflating of damaged and/or deflated inflatable articles, designed to eliminate the problems and drawbacks associated with the prior art.

In accordance with one aspect of the invention there is provided an apparatus for repairing and/or inflating a damaged and/or deflated inflatable article, said apparatus including: a first container for receiving and retaining for dispensing a sealant composition; a second container including a compressor assembly which is releasably connectable to said first container; and means allowing for controlled dispensing of said sealant composition from said first container to said inflatable article, wherein said compressor assembly includes a housing for a compressor which defines, with the interposition of valve means, a seating for said container.

In accordance with another aspect of the invention there is provided a valve means for use with apparatus for repairing and/or inflating a damaged and/or deflated inflatable article, said apparatus includes a first container for receiving and retaining for dispensing a sealant solution and a second container including a compressor assembly, wherein said valve means is adapted to be interposed between said first and second containers and to be releasably connectable, via respective first and second feed-lines, to said compressor assembly and said damaged and/or deflated article.

In accordance with yet a further aspect of the invention there is provided a kit for repairing and/or inflating a damaged and/or deflated inflatable articles, said kit including: a compressor assembly; a container of sealing liquid; connecting means for connecting the container to the compressor assembly and to an inflatable article for repair or inflation, wherein said compressor assembly includes an outer casing defining seat for the container of sealing liquid, said container of sealing liquid being housed removably in said seat, wherein said connecting means stably connects said container to said compressor assembly so that said container, when housed in said seat, is maintained functionally connected to said compressor assembly.

DESCRIPTION OF THE DRAWINGS

In order that the invention may be more clearly understood and put into practical effect reference will now be made to particularly preferred embodiments of the apparatus in accordance with the present invention. The ensuing description is given by way of non-limitative example only and is with reference to the accompanying drawings, wherein.

DESCRIPTION OF PREFERRED EMBODIMENTS

Figure 1:
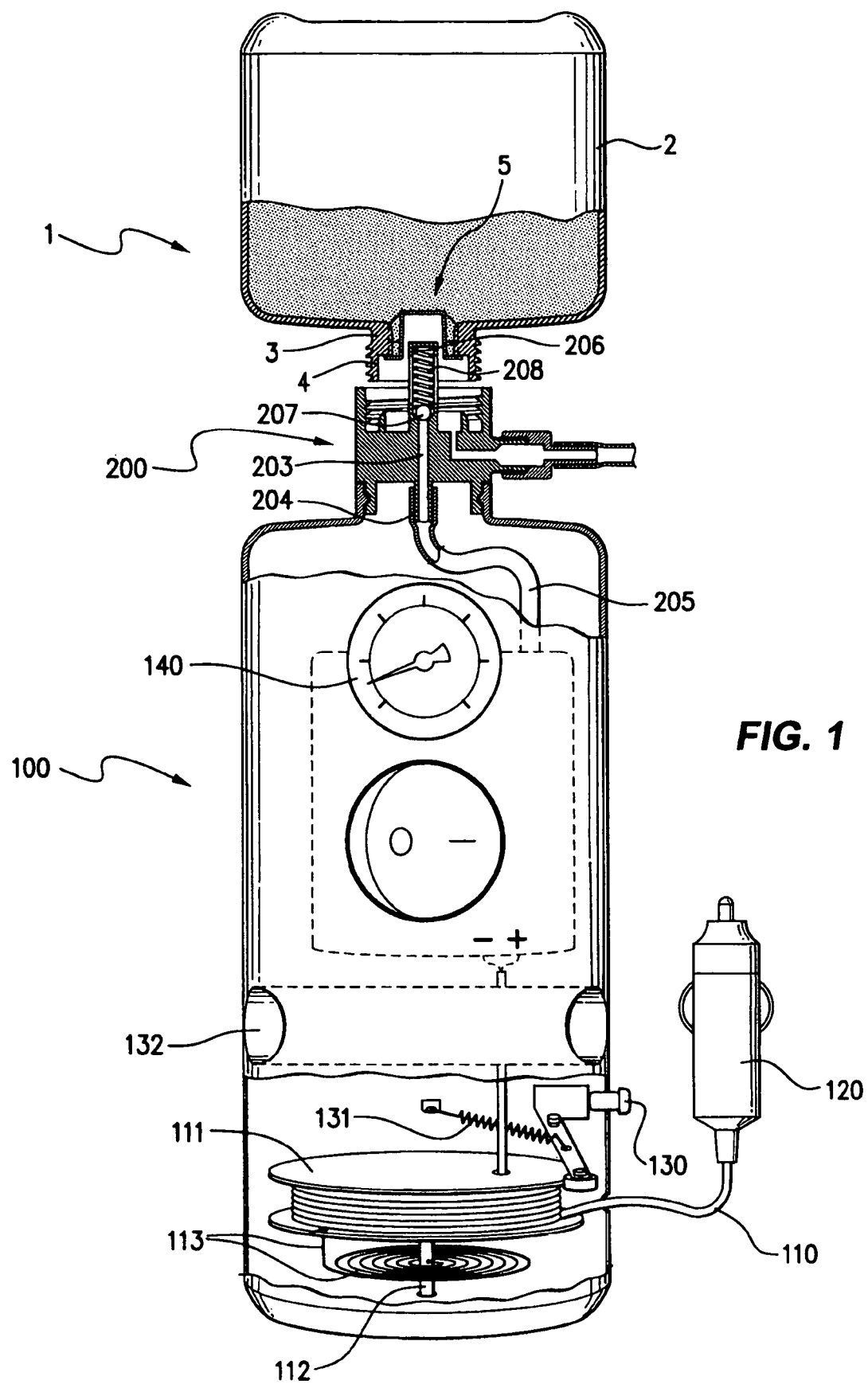
FIG. 1 is a side view of one embodiment of an apparatus in accordance with the present invention.

With reference firstly to FIG. 1 an apparatus in accordance with this particular embodiment of the present invention includes, as principal components, a first container or receptacle generally designated 1, and a second container or canister, generally designated 100, which has housed therewithin a compressor assembly and associated equipment, to be described in more detail later in this specification. The arrangement as such that, when not in use, the respective containers 1 and 100 will preferably be kept and stored separately. However, when required to be used the two containers 1 and 100 may be interconnected in any known manner, as for example by the interaction of making or complimentary threaded means associated therewith.

The first container 1 and canister/compressor assembly 100 are stored together when not in use, to be located at an appropriate location on or within the vehicle, as for example within the boot space of that vehicle. When required to be used—in the instance of a puncture—the first container 1 and canister/compressor assembly 100 will be removed from storage and brought into an operating configuration in a manner to be described hereinafter in more detail.

The first container 1 may be constructed from any suitable material, and more preferably of a plastics material, and may be of any suitable shape. In the preferred embodiment illustrated the container 1 is in the form of a substantially cylindrical bottle having a main body portion 2 with a neck portion 3 extending substantially normally therefrom, said neck portion 3 including an externally threaded section 4. The first container 1 is intended to house, for dispensing as and when required, a fluid for purposes of repairing a damaged inflatable article (as for example a punctured vehicle tyre). The repair fluid may be of any known type. In an especially preferred embodiment the repair fluid will be of the type described and defined in the present applicant's International (PCT) Patent Applications Nos. PCT/AU2008/001499 or PCT/AU2007/001222, or Australian Patent Application No. 2009905952. It should be understood, however, that neither the material of construction of the first container 1, nor the shape or configuration of that container 1, nor the actual composition of the repair fluid, constitute a part of the present invention.

Figure 3A:
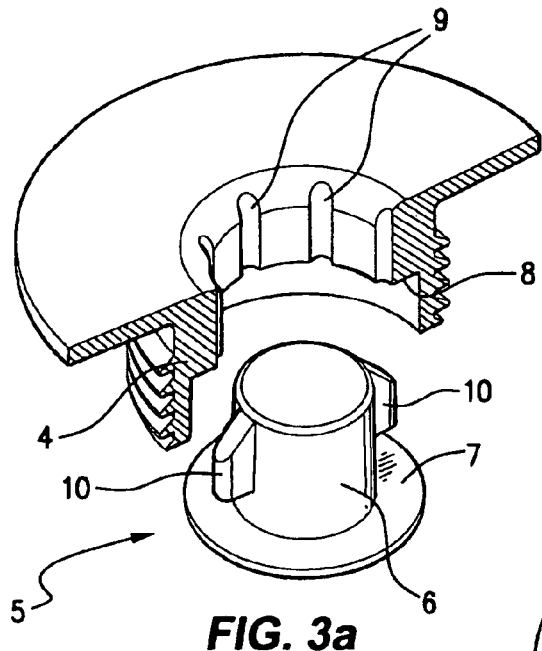
FIGS. 3a to 3c are exploded sectional views showing a container for sealant composition in accordance with the present invention and a sealing means associated therewith.
Figure 3B:
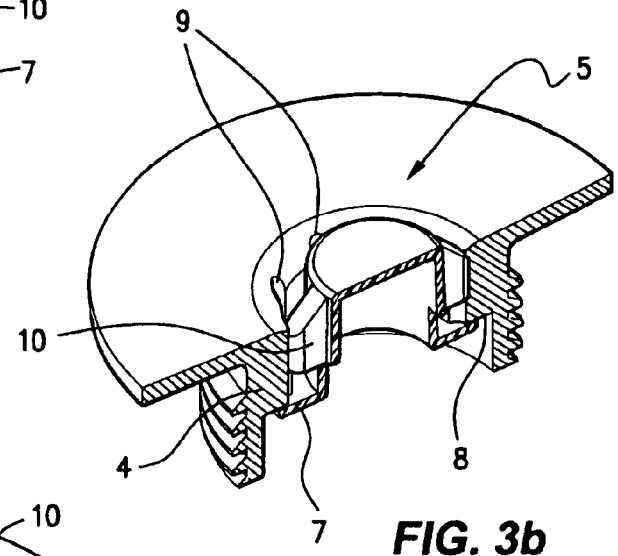
Figure 3C:
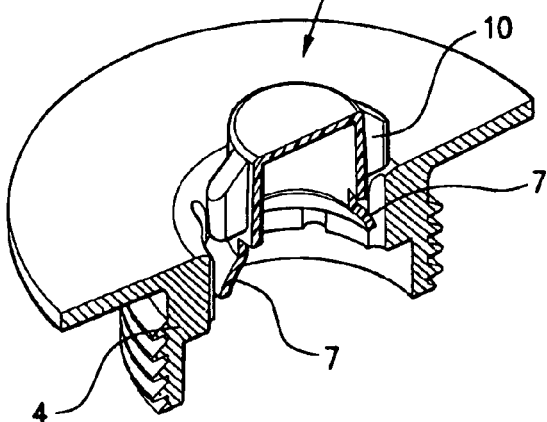
Figure 4:
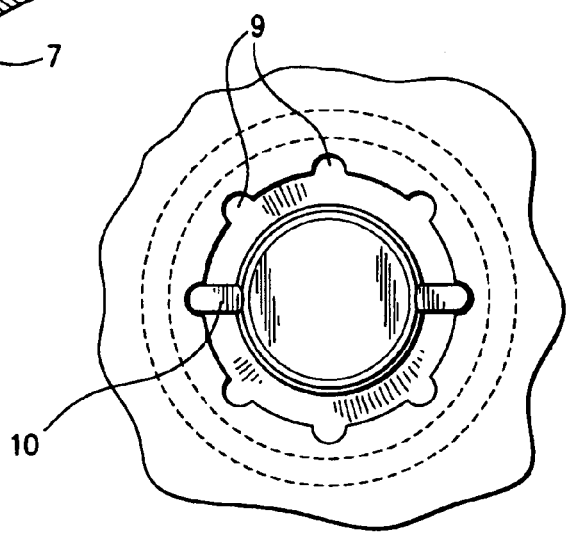
FIG. 4 is a top view of the arrangement shown in FIGS. 3a, 3b and 3c.

The first container 1 has associated therewith, and adapted in use to be disposed within the neck portion 3, a sealing means generally designated 5, as shown in more detail for example in FIG. 3a. The sealing means 5 includes a main body portion 6, preferably substantially cylindrical in configuration, which is closed at one end thereof. At the other free end thereof there is provided a peripheral flange 7. In the preferred embodiment illustrated—see for example FIGS. 3a to 3c—the neck portion 3 of the first container 1 has a peripheral internal step 8 formed therein, such step 8 to constitute a seating for the sealing means 5, with the flange 7 of the sealing means 5 overlying the step 8 of the neck portion 3, whereby to assist in sealing of—preventing leakage from—the container 1 when it is not in use. As shown in FIG. 3a the neck portion 3 of the first container 1 preferably includes a plurality of circumferentially spaced—apart splines 9 extending substantially longitudinally thereof. In an alternative embodiment, not shown, rather than a plurality of splines the sealing means 5 may have a line of weakening (formed during moulding or manufacture thereof) extending around at least part of the periphery thereof. Such line of weakening will break as the container 1 is connected with, as by screwing onto, the second container/compressor assembly 100.

The sealing means 5 further preferably includes at least two diametrically opposed shaped protrusions 10, extending along at least part of the length of the main body portion 6 thereof. Preferably the sealing means 5 will be constructed from a suitable plastics material, as for example a relatively soft, low-density polyethylene.

Turning now to the second container or canister/compressor assembly, such is preferably in the form of a shaped container 100 which serves as a housing for a compressor and associated equipment. Preferably the container includes a main body section 101, of a substantially cylindrical shape, which is closed at one end to form a base and has a neck portion 102 extending substantially normally from the upper end thereof, which neck portion 102 is adapted to receive and releasably retain a valving assembly, generally designated 200, to be described in more detail later in this specification. The container 100 includes, housed therewithin, a compressor, motor or the like for operation thereof, and means allowing for connection of said compressor, motor or the like to a suitable power source. In the especially preferred embodiment illustrated such will take the form of a retractable cord or electrical conduit 110 which is adapted to be wound about a spindle or the like 111 disposed at or in the vicinity of the base of the container 100 and to be rotatable on or about a stub axle 112, with the cord 110 having associated therewith at the free or external end thereof an adaptor or connector 120, of any known type, which in use can be releasably connectable to the cigarette lighter outlet or the equivalent power outlet of the vehicle, whereby to allow for activation/operation of the motor, and hence the compressor, as and when required.

In an alternative embodiment, not shown, the retractable cord or conduit, associated spindle, stub axle and other components may be disposed/located at or in the vicinity of the top of the container 100. The actual spatial location of these various components within the container 100 is not of the essence of the invention.

The arrangement includes means allowing for retraction of the cord 110 when not in use. The means for extraction/retraction of the cord 110 are not of the essence of the invention. In the preferred embodiment illustrated, however, the spindle 111 (with associated cord 110) may be in connection with a spring means, as for example a watch spring or the like 113. The arrangement is such that, when required to be used for purposes of repairing/re-inflating a damaged vehicle tyre, thus by pulling on the adaptor 120 the cord 110 can be unwound from the spindle 111 to an extent sufficient to allow the adaptor 120 to be inserted into the cigarette lighter outlet or an equivalent power outlet of the vehicle. When no longer in use, pressing on the push button 130 associated with the container 100, in operative connection with a spring means or the like 131, acts to retract the cord 110 back into the container 100, to be rewound on spindle 111.

In the embodiment of FIG. 1 the second container 100 further includes means for housing said connector or adapter 120 when not in use. Such will preferably take the form of a bore 132, of a shape complementary to the external shape of the adapter 120, extending substantially transversely of said second container 100.

The container preferably includes a pressure gauge or the like 140 (of any known type).

The valve assembly 200 includes a main body 201, preferably substantially cylindrical in configuration, which is adapted in use to be associated with the neck portion 102 of the container/canister 100. Such can be achieved in any suitable manner, as for example by having the neck portion 102 have at least one protrusion 103 extending substantially laterally thereof which is adapted, in use, to be located within a complementary—shaped slot 104 formed in the lower end portion of the main body 201 of the valve assembly 200. Alternatively, the neck portion 102 and lower end portion of the main body 201 may be provided with complementary mating respective internal and external threaded sections (not shown).

At the opposed free end of the main body 201 of the valve assembly 200 there is provided an internal threaded section 202 which is adapted, in use, to co-operate with the threaded neck portion 4 of the container 1.

The main body 201 of the valve assembly 200 further includes, extending axially thereof, a passage 203. At the lower end of the main body 201 that passage 203 terminates in a means 204 which is adapted to receive and preferably releasably retain relative thereto a hose 205 which extends from the compressor housed within the container/canister 100 whereby to supply air, via said passageway 203 extending axially of the main body 201, to be ultimately dispensed into a damaged inflatable article in a manner to be described hereinafter. The passageway 203 extends through the main body 201 of the valve assembly 200 and upwardly into a tubular hollow extension 206 of that main body 201, said extension 206 having housed therewithin a ball valve 207 in position and associated spring means 208, which spring means 208 acts to retain the ball valve 207 relative to a seating 209 provided within the extension 206. The extension 206 includes one or more apertures 210 which, upon release of the ball valve 207 from its seating 209, will allow for flow of air therethrough.

The main body 201 of the valve assembly 200 further includes another passageway 220, in flow connection with a ball valve/spring arrangement 221,222, housed within a lateral tubular extension of said main body 201. Releasably attachable to said extension of said valve assembly 200, in any known manner and using any known means, is a hose or length of tubing 223 which is adapted, in use, to be releasably connected to the damaged inflatable article (not shown), via the valve provided thereon.

The principle of operation of the apparatus in accordance with the present invention will now be described in more detail with reference to the drawings.

Figure 2A:
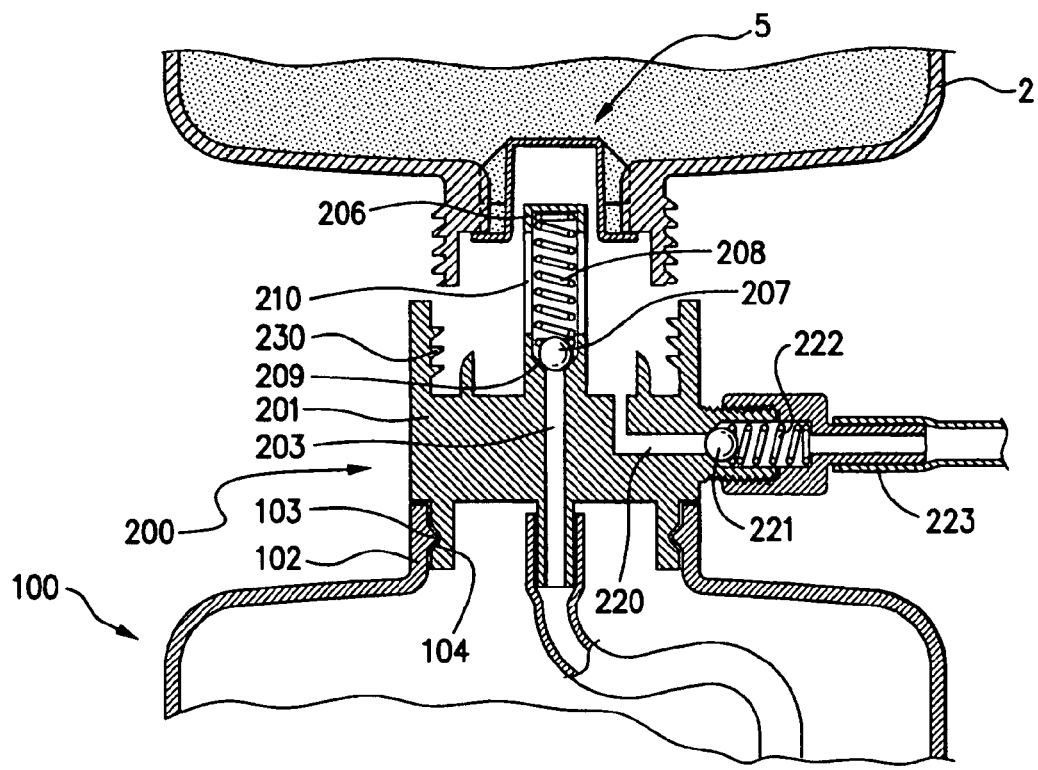
FIGS. 2a to 2e are sectional views showing different stages in the procedure of interconnection of a container of sealant compound to a compressor/dispensing means therefor in accordance with the invention.
Figure 2B:
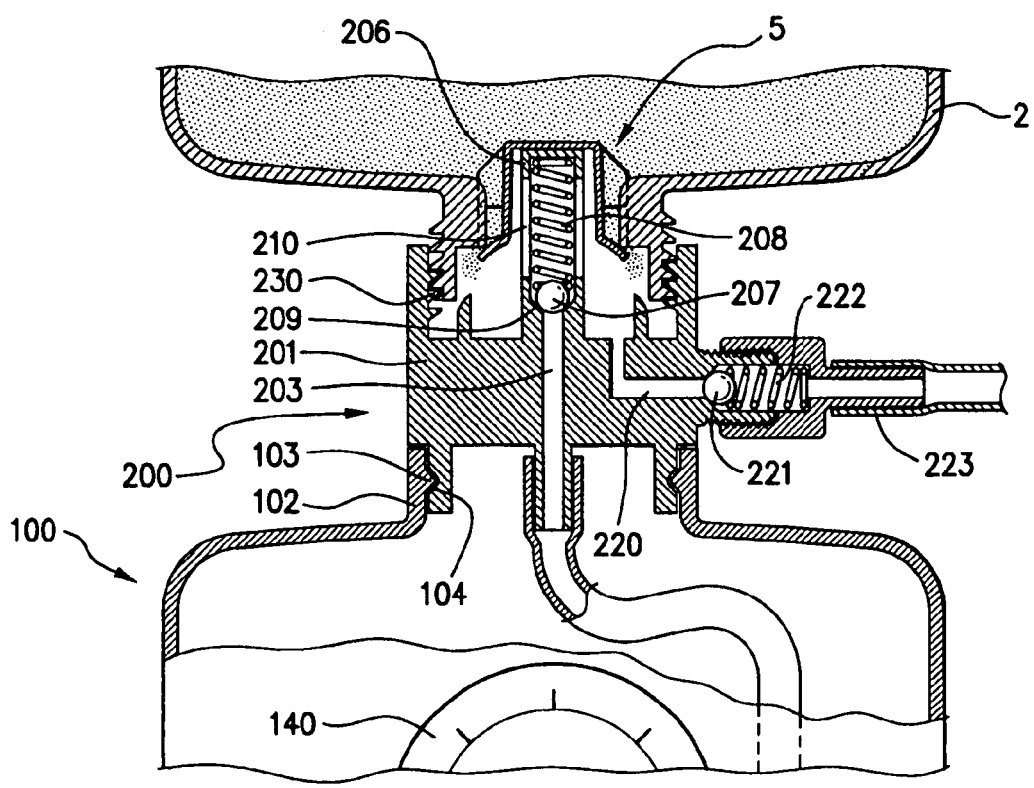
Figure 2C:
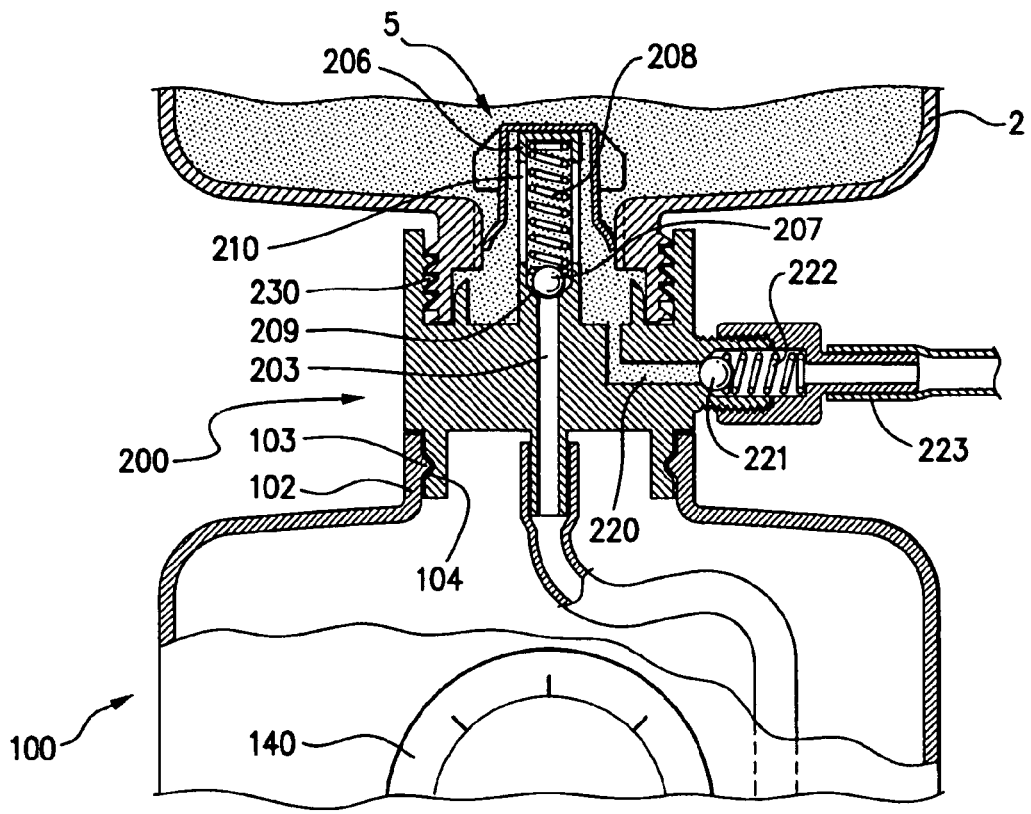
Figure 2D:
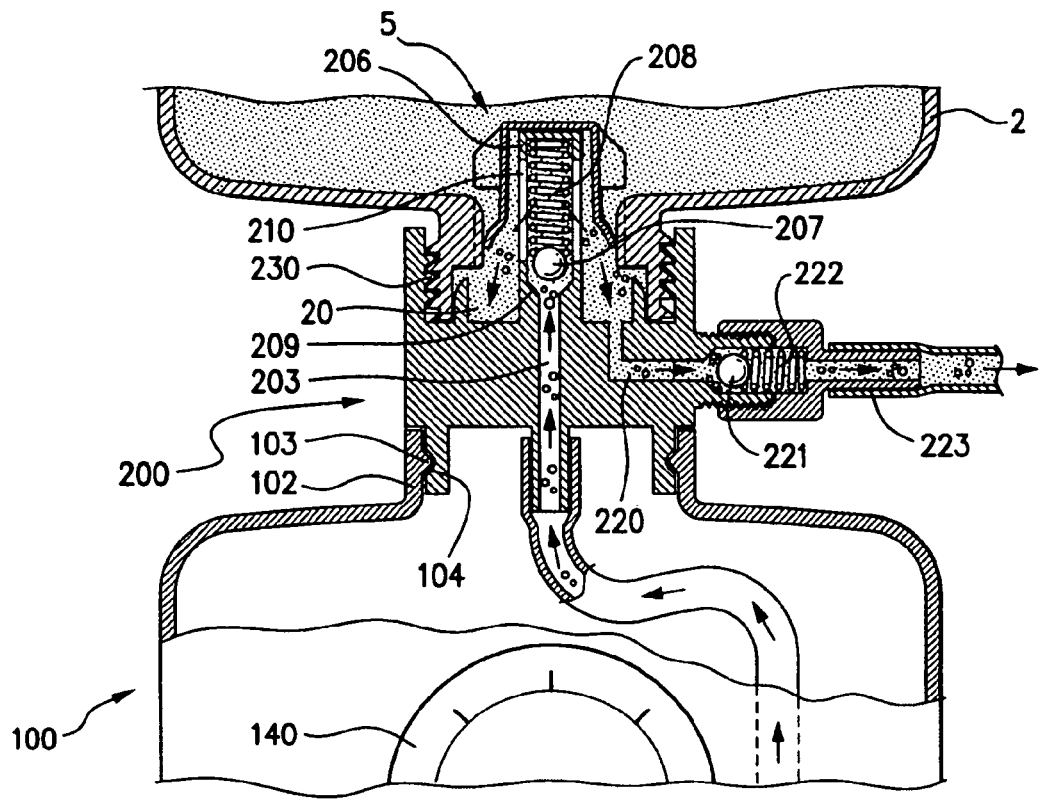
Figure 2E:
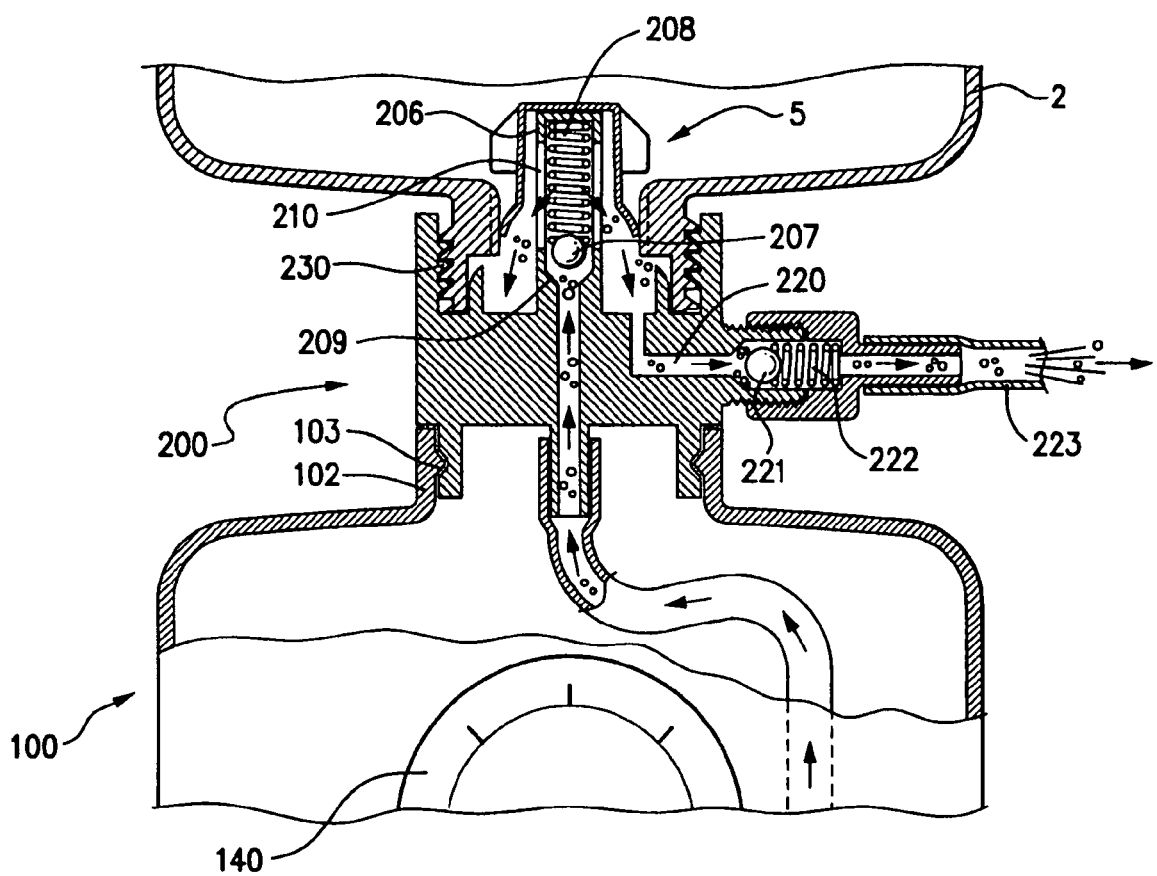

The overall assembly of first container 1 and second container/compressor 100 is, as stated earlier, preferably interconnected as follows and stored within the vehicle for use as and when necessary. The containers' of sealant composition will be inverted, as shown for example in FIG. 1, and progressively brought into flow connection with the compressor assembly 100, as shown in FIGS. 2a to 2c in sequence. The external threaded section 4 on the neck portion 3 of the container 1 is brought into engagement with complementary internal threads 230 provided on the uppermost end section of the main body 201 of the valve assembly 200. As the container 1 is progressively wound or threaded onto the container/compressor assembly 100, the valve stem 206 comes into contact with the cap seal 5 and distends that seal or in the alternative embodiment, as briefly described but not illustrated, results in rupturing of the line of weakening. In real terms the peripheral flange 7 of the cap seal 5 is progressively bent, as that seal 5 is moved out of engagement with the seating 8, to the position as shown for example in FIG. 2d. Such will allow liquid sealant composition from the container 1 to be dispensed, when required, from that container 1 and to be directed into the space 20 thus created. When the compressor is activated, for example, air pressure builds up to open the ball valve 207, whereby to allow pressurised air generated by the compressor to turbulently mix with the liquid sealant composition from the container 1. Further operation of the compressor results in the air/liquid composition travelling through the passageway 220 to in turn activate the further ball valve 221, whereby to direct that mixture via the outlet/hose 223 into the tyre. Air pressure forces the air/liquid mixture to be injected into the tyre and to be dispensed/propelled around the interior thereof, to eventually seal any puncture(s) existing therein. Further operation of the compressor will then result in controlled re-inflation of the now repaired tyre. The pressure gauge 140 will allow the user to inflate the repaired tyre to the requisite/desired extent. Movement of the vehicle will result in distribution of sealant composition throughout the entire tyre chamber. Once inflated as required, then the compressor assembly and associated container 100 can be removed from the tyre, as by disconnection of the hose 223 from the tyre valve. The empty container 1 can then be re-filled or replaced, as necessary, to allow for future re-use of the overall apparatus.

The preferred embodiment, as previously described in detail, utilizes one-way valves, in the form of ball valves designated as 207 and 221 respectively. In an alternative embodiment, not shown, at least the ball valve 221 may be replaced, as by an in-line pressure gauge and air-release button associated therewith, to be used in the instance of the tyre or other damaged inflatable article becoming over-inflated after repair thereof.

The arrangements in accordance with the present invention represent an extremely viable alternative to the prior art, which in one alternative was in the form of an aerosol container including a suitable composition, which could be stored in the vehicle for use, when necessary, and subsequent disposal. Such aerosol containers have inherent problems associated therewith, not the least of which is the possibility of rupture, the inclusion therein of inflammable substances, etc. The present applicant's arrangement, by not involving storage at an elevated pressure of a flammable substance or substances, is safer than the prior art aerosol containers.

Whilst the actual make-up of the composition to be used with the present invention is not of the essence of the invention, it will preferably not be latex-based. This means that the apparatus will be re-usable, without the need for cleaning, once the first container 1 has been replaced or replenished. Such is in marked contrast to what would be the situation if a latex-based composition was to be used. With latex-based compositions all valves, hoses etc would need to be thoroughly cleaned before being re-usable. The standard practice with arrangements of this general type, which use latex-based compositions, is to replace all hoses, clean and/or replace all valves etc prior to the apparatus being capable of being re-used.

The present invention, which allows for ready re-use and/or re-cycling, is therefore more environmentally responsible and user friendly. Not only is the first container 1 re-cyclable (without the need for cleaning using detergents, solvents and the like), but all hoses, valves etc. included in the apparatus should be re-usable without any need for cleaning.

The preferred embodiment illustrated includes sealing means 5 to be associated with the first container 1. In a further alternative, not illustrated, no such additional sealing means will be necessary. With such an alternative, at manufacture or when container 1 is to be replenished or replaced, the procedure will be that the compressor assembly/second container 100 is first inverted, the first container 1 is retained upright, with the two components then being screwed together (by the interaction of mating threaded sections). The one-way ball valve 207 will ensure that there does not occur unwanted leakage of content from the first container 1. Once interconnected, the overall assembly can be disposed in any way, at any angle, without fear of leakage until such time as the compressor is actuated to release ball valve 207.

Figure 5:
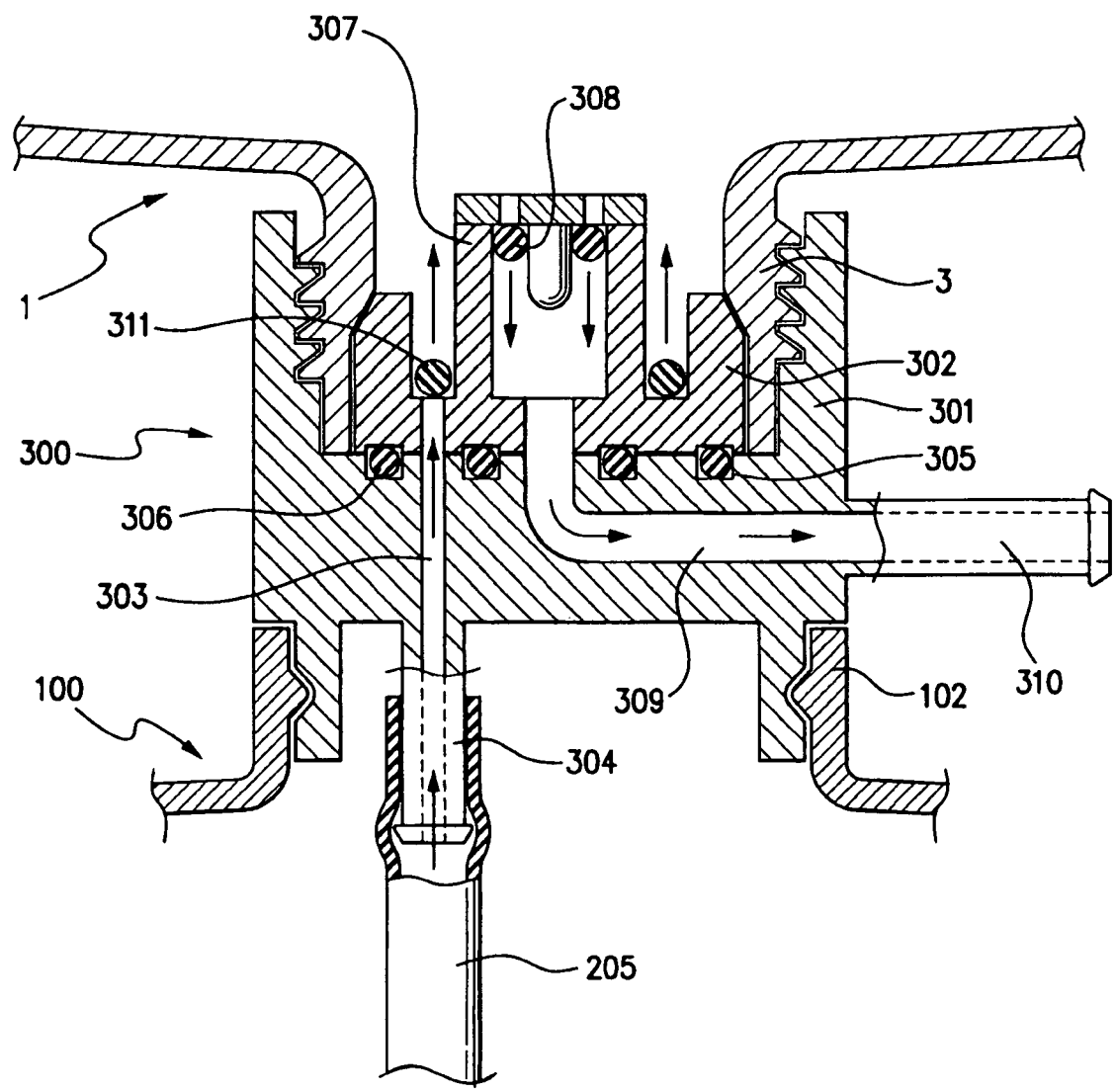
FIG. 5 is a schematic representation of yet a further embodiment of an apparatus in accordance with the invention.

Turning now to the embodiment as illustrated informally in FIG. 5, such is a variant intended to allow for the situation wherein a damaged inflatable article is repaired and then, inadvertently, over-inflated. Such a situation could come to pass in any number of ways, as for example if the user of the apparatus is, for whatever reason, distracted during the inflation procedure, with that procedure continuing for too long, resulting in over-inflation. Certainly it would be possible, by disconnecting the overall apparatus from the tyre, to physically deflate that tyre, by manual manipulation of the tyre valve. However, without using a pressure gauge the extent of deflation needed would not be gauged accurately.

With the previously disclosed embodiments, which use ball-valves, it should be understood that such ball valves are one-way valves, such that deflation—in the instance of over-inflation—would not be readily, practically possible. The embodiment shown in FIG. 5 addresses this situation/problem.

In similar manner to the earlier described embodiment, in the embodiment of FIG. 5 there is provided a valve assembly, generally designated 300, which includes a main body 301, preferably substantially cylindrical in shape, and which is adapted in use to be associated with the neck portion 102 of the container/canister 100, in any known manner and using any suitable and known means. The arrangement is that the neck portion 3 of the first container 1 is adapted in use to be associated with the main body 301 of the valve assembly 300, with the interposition of a shaped insert 302 which may be, constructed of any suitable material, as for example a plastics material. The main body 301 has, extending longitudinally thereof, a passageway 303 which, at its lowermost end, terminates in a means 304 adapted to receive, and releasably retain relative thereto, the hose or the like 205 which extends from the compressor housed within the container/canister 100. The main body 301 further includes shaped indents or grooves 305 each adapted to receive and releasably retain therewithin, an O-ring seal 306 or the like. Protruding substantially normally from the upper face of the main body 301 is a hollow extension 307 which is sealed at its uppermost end by a further O-ring seal 308. The main body 301 includes a further passageway 309 terminating in a lateral extension 310 adapted, in use, to be releasably connected with a hose or the like length of tubing to be connected to the valve of a damaged inflatable article.

Located at the top end of the passageway 303 is yet another O-ring seal 311, adapted to constitute a seal for said passageway 303.

With this arrangement, as with the other embodiments described, the first container 1 and second container/canister 100 are interconnected, with the interposition of the valve assembly 300. The compressor housed within container/canister 100 is in flow connection with the passageway 303. In use the outlet 310 is in flow connection with the damaged tyre.

When the compressor is actuated, air commences to flow into the passageway 303. As pressure builds, the O-ring seal 311 will be moved from its seating, allowing air to flow via the passageway 303 into the container 1, to be mixed with the content thereof. As the compressor continues to operate, the O-ring seal 308 will be forced relatively downwardly, in the direction of the arrow as shown, to allow the mixture of air and sealant composition to flow into the passageway 309, and from there via the outlet 310 and associated hose or tubing to the tyre. Operation of the compressor will be continued until such time as, firstly, the content of the container 1 has been dispensed/injected into the tyre, and will continue until such time as the tyre is re-inflated to the desired pressure (determined by reference to the pressure gauge). If over-inflation happens to occur, then if operation of the compressor is interrupted the apparatus allows for deflation to the extent needed.

The arrangements in accordance with the present invention exhibit a number of significant practical advantages when compared with the prior art. Firstly, since the first container 1 and second canister/compressor assembly 100 may be provided connected together (even when not in use), actual use thereof when necessary is simplified. Indeed all that the user need do is connect a single hose (or the like) from the assembly to the tyre valve. Such a simple, one-step operation should be capable of being performed by anyone, regardless of age, sex or physical limitations.

Secondly, the arrangement is readily re-usable. Once the first container is empty of its contents, it is easily separated from the second container/compressor assembly, for either re-filling with fluid or, more preferably, replacement.

Furthermore, and this especially with the embodiment of FIG. 5, the apparatus allows for ready, controlled deflation in the event of over-inflation.

The arrangements in accordance with the present invention are furthermore compact (and hence readily stored), lightweight (facilitating use) and hence require significantly less room for storage when compared with the prior art.

Finally it is to be understood that the aforegoing description refers merely to preferred embodiments of the invention, and that variations and modifications will be possible thereto without departing from the spirit and scope of the invention, the ambit of which is to be determined from the following claims.

The invention claimed is:

1. An apparatus for repairing and/or inflating a damaged and/or deflated inflatable article, said apparatus including:
    a first container for receiving and retaining for dispensing a sealant composition,
        wherein said first container includes a vessel for containing said sealant composition, said vessel including an externally threaded neck portion defining an opening, and a first sealing means to close said opening,
        wherein said first sealing means includes a main body portion which is closed at one end thereof and is adapted to be located within said neck portion of said vessel, said main body portion of said first sealing means including a peripheral flange at the other, free end thereof, and
        wherein said neck portion of said vessel further includes an internal step which, in use, constitutes a seating for said peripheral flange of said first sealing means;
    a second container, including a compressor assembly which is releasably connectable to said first container, wherein said compressor assembly includes a housing for a compressor; and a valve assembly allowing for controlled dispensing of said sealant composition from said vessel to said inflatable article, wherin said valve assembly defines a seating for said first container, and wherein said neck portion of said vessel includes a plurality of circumferentially spaced-apart splines extending substantially longitudinally thereof.

2. The apparatus as claimed in claim 1, wherein said first sealing means for said vessel further includes at least one pair of diametrically opposed protrusions extending along at least part of the length of the main body portion thereof.

3. The apparatus as claimed in claim 2, wherein said second container is in the form of a bottle of a substantially cylindrical shape, adapted to have located therewithin said compressor assembly.

4. The apparatus as claimed in claim 3 wherein said valve assembly is interposed between said first and second containers and is releasably connectable, via a feed-line, to said compressor assembly.

5. The apparatus as claimed in claim 4, wherein said second container includes a main body portion which is closed at one end and has a neck portion extending substantially normally from the other, open end thereof, said neck portion of said second container being adapted, in use, to receive and releasably retain said valve assembly.

6. The apparatus as claimed in claim 5, wherein said second container has disposed therewithin means allowing for connection to a source of power, said connection means being in the form of a retractable cord or power conduit adapted to be controllably wound around a spindle disposed within said second container, said cord or conduit having, at one end thereof, adaptor means allowing for connection to a source of electrical energy/power.

7. The apparatus as claimed in claim 6, wherein said second container further includes spring means activatable to allow for extraction or retraction of said cord or conduit and a pressure gauge.

8. The apparatus as claimed in claim 4, wherein said valve assembly includes a main body portion, adapted to be releasably connected to said neck portion of said first container and to said neck portion of said second container.

9. The apparatus as claimed in claim 8, wherein said main body portion of said valve assembly includes a first passageway extending axially thereof, said first passageway terminating, at one end thereof, with means allowing for releasable connection to said compressor assembly, and at the other end thereof in a substantially tubular extension having a second sealing means located/housed therewithin, said substantially tubular extension, in use, being associated with said first sealing means of said first container.

10. The apparatus as claimed in claim 9, wherein said tubular extension includes a discontinuity/internal step therein which acts as a seating for resilient means associated with said ball valve.

11. The apparatus as claimed in claim 10, wherein said valve assembly includes a second passageway, in use to be in flow connection with a lateral substantially tubular extension of said main body portion of said valve assembly, with a spring operated ball valve means interposed therein, wherein said lateral extension includes means allowing for releasable connection to a hose, in turn to be releasably connected to said inflatable article.

12. The apparatus as claimed in claim 6, wherein said spindle is disposed at or in the vicinity of the base of said second container.

13. The apparatus as claimed in claim 9, wherein said second sealing means is a ball valve.

14. An apparatus for repairing and/or inflating a damaged and/or deflated inflatable article, said apparatus including:

a first container for receiving and retaining for dispensing a sealant composition, wherein said first container includes a vessel for containing said sealant composition, said vessel including an externally threaded neck portion defining an opening;

a second container including a compressor assembly which is releasably connectable to said first container, wherein said compressor assembly includes a housing for a compressor;

a valve assembly allowing for controlled dispensing of said sealant composition from said vessel to said inflatable article, wherein said valve assembly defines a seating for said first container, and wherein said neck portion of said vessel includes a pluraltiy of circumferentially spaced-apart splines extending substantially longitudinally thereof; and wherein said valve assembly is adapted to be interposed between said first and second containers and to be releasably connectable, via a feed-line, to said compressor assembly;

wherein said second container includes a main body portion which is closed at one end and has a neck portion extending substantially normally from the other, open end thereof, said neck portion of said second container being adapted, in use, to receive and releasably retain said valve assembly wherein said valve assembly includes a main body portion adapted to be releasably connectable to said neck portion of said first container and to said neck portion of said second container, and insert being interposed between said valve assembly and said neck portion of each container.

15. The apparatus as claimed in claim 14, wherein said insert is constructed from a plastics material.

16. The apparatus as claimed in claim 15, wherein said main body portion of said valve assembly includes, extending substantially longitudinally thereof, a first passageway which, at its lowermost end, terminates in means allowing a hose, in flow connection with said compressor assembly, to be releasably retained relative thereto.

17. The apparatus as claimed in claim 16, wherein said main body portion of said valve assembly includes, on its upper surface thereof, a plurality of shaped indents or grooves adapted to receive, and releasably retain, a first sealing means.

18. The apparatus as claimed in claim 16, wherein said main body portion of said valve assembly includes, protruding substantially normally from the upper surface thereof, a hollow extension which is sealed, at its uppermost end, by a second sealing means.

19. The apparatus as claimed in claim 18, wherein said main body portion of said valve assembly further includes, extending substantially normally from a lateral surface thereof, a lateral hollow extension which is adapted, in use, to be releasably connectable to a hose, in turn to be connected releasably to said inflatable article.

20. The apparatus as claimed in claim 19, wherein said insert includes respective first and second passageways which are adapted, in use, to be in flow connection with said first and second passageways respectively of said main body portion of said valve assembly.

21. The apparatus as claimed in claim 20, wherein said first passageway of said insert includes, at its upper end thereof, a third sealing means.

22. The apparatus as claimed in claim 17, wherein said first sealing means is an O-ring seal.

23. The apparatus as claimed in claim 18, wherein said second sealing means is an O-ring seal.

24. The apparatus as claimed in claim 21, wherein said third sealing means is an O-ring seal.

* * * * *